United States Patent Office.

GERHARD NICOLAAS VIS, OF SCHWEIZERHALLE, SWITZERLAND.

PROCESS OF PURIFYING BRINE.

SPECIFICATION forming part of Letters Patent No. 623,295, dated April 18, 1899.

Application filed December 23, 1898. Serial No. 700,098. (No specimens.)

*To all whom it may concern:*

Be it known that I, GERHARD NICOLAAS VIS, doctor of philosophy, chemist, a subject of the Queen of the Netherlands, residing at Schweizerhalle, near Basle, Switzerland, have invented a new and useful Process for the Purification of Brine; and I do hereby declare that the following is a full, clear, and exact description of the invention, which will enable others skilled in the art to which it appertains to make and use the same.

The present invention relates to the extraction of common salt (chloride of sodium) from brine; and it consists in a process for purifying the said brine from its sulphates, (sulphate of sodium, sulphate of potassium, sulphate of magnesium, sulphate of calcium, &c.)

The difficulties met with in the extraction of salt from brine by simple evaporation, and especially in a vacuum, are principally due to the presence of sulphate of calcium (gypsum) in the brine. Numerous apparatuses and processes have been described which have for their object to remedy these drawbacks.

The calcium sulphate contained in the brine may be rendered innocuous either by precipitating the one component (calcium) by means of carbonate of soda or the other component (the sulphuric acid) by means of barium compounds.

In order entirely to obviate the drawbacks which are caused by the presence of gypsum on evaporating brine, it has been proposed to precipitate the salt (chloride of sodium) from the brine by adding thereto certain fluids in which common salt is hardly or not at all soluble—for instance, by means of a solution of chloride of calcium or by means of alcohol. On the other hand, attempts have been made to treat hot crude rock-salt with fluids which hardly dissolve gypsum—as, for instance, solution of chloride of calcium—and afterward to cool the solution of salt obtained, and thereby to obtain pure chloride of sodium direct, completely avoiding the evaporation process. In view, however, of the concentrated solution of chloride of calcium necessary in both cases, whereby there is obtained a salt containing chloride of calcium, and being in consequence hygroscopic, and, further, in view of the complication and expense of the above-stated processes, they have been hitherto of little value in practice. It remains, however, extremely desirable to have as simple a process as possible which will enable salt to be produced of the requisite purity. From this point of view the process which has been already proposed for purifying brine by means of barium salts, such as chloride of barium ($BaCl_2$) or carbonate of barium, ($BaCO_3$,) according to the reactions—

$$CaSO_4 + BaCl_2 = CaCl_2 + BaSO_4,$$

or $$CaSO_4 + BaCO_3 = CaCO_3 + BaSO_4,$$

appears to be the most desirable; but such application of barium compounds is, in consideration of their relatively high price, prevented by the very large quantities which would be requisite in the case of most brines, as may be seen from the following table:

| One cubic meter of— | Chloride of barium. | Carbonate of barium, (witherite.) |
|---|---|---|
| Sea-water requires.. | 6.56 kilos. | 5.25 kilos. |
| Schweizerhalle brine | 10.26 kilos. | 8.22 kilos. |
| Gouhenans brine... | 11.61 kilos. | 9.30 kilos. |
| Italian brine....... | 14.67 kilos. | 11.75 kilos. |
| Austrian brine..... | 16.72 kilos. | 13.40 kilos. |
| Dieuze brine....... | 17.04 kilos. | 13.65 kilos. |
| Tomblaine brine ... | 25.27 kilos. | 20.24 kilos. |
| Montmorrot brine .. | 25.62 kilos. | 20.52 kilos. |

I have discovered that chloride of calcium added even in small quantity to brine will not only convert the sulphate of sodium, potassium, magnesium, &c.—that is to say, the basic component of which is some other base than calcium or the non-calcic sulphates—into gypsum (sulphate of calcium) which falls to bottom, but that also the greater part of the gypsum which is original to the brine will also precipitate. The precipitation is proportional to the quantity of chloride of calcium added, as is shown in the following table:

| One cubic meter of Schweizerhalle brine decomposed with chloride of calcium. | One hundred cubic centimeters of the brine treated yielded sulphate of barium. | Quantity of gypsum present in one cubic meter. | Witherite requisite for one cubic meter. |
|---|---|---|---|
| 0.84 kilo. | 0.9630 gram. | 5.65 kilos. | 8.10 kilos. |
| 1.8 kilos. | 0.8240 gram. | 4.81 kilos. | 6.93 kilos. |
| 3.6 kilos. | 0.7540 gram. | 4.40 kilos. | 6.34 kilos. |
| 7.2 kilos. | 0.4300 gram. | 2.51 kilos. | 3.61 kilos. |
| 10. kilos. | 0.3580 gram. | 2.09 kilos. | 3.01 kilos. |
| 14.4 kilos. | 0.2600 gram. | 1.52 kilos. | 2.19 kilos. |
| 28.8 kilos. | 0.1945 gram. | 1.13 kilos. | 1.64 kilos. |
| 57.6 kilos. | 0.0965 gram. | 0.56 kilo. | 0.81 kilo. |

Thus my discovery enables the purification of brine from the sulphates to be carried out by means of a greatly-reduced proportion of barium compounds. In applying my discovery it is possible to remove the greater part of the sulphates from the brine almost free of expense, because the waste liquors of the ammonia soda works containing chloride of calcium are applicable for the purpose and to reduce the consumption of barium compounds to that minimal quantity which is necessary for decomposing the remainder of gypsum.

While the previous applications of chloride of calcium for direct production of culinary salt have been devised either for the purpose of precipitating chloride of sodium from the brine or for the purpose of dissolving solid salt in hot chloride-of-calcium solution and reprecipitation of sodium chloride by subsequent cooling, in this process, on the contrary, the addition of chloride of calcium serves for the partial removal of sulphates from the brine. The quantity of chloride of calcium to be used is a very different one from the foregoing, corresponding to the entirely different principle and object of the present process. For instance, it has proved economical and practicable to treat the brine of Schweizerhalle, near Basle, in Switzerland, with an addition of chloride of calcium, amounting to from seven to eight kilos per cubic meter of brine. By means of this addition no sodium chloride is precipitated. On the other hand, the sulphates contained are so far precipitated that the purification, for instance, with carbonate of barium or witherite becomes profitable.

Obviously the above-stated quantity of chloride of calcium is not to be regarded as an invariable proportion, because this, as already stated, is adapted to the brine of Schweizerhalle. In the case of brines containing a larger proportion of sulphates such a larger quantity of chloride of calcium must be applied as is required by the principle of this invention—i. e., such a quantity that in addition to the conversion of the non-calcic sulphates into precipitated sulphate of calcium also the greater part of the gypsum originally present in solution in the brine is caused to deposit. After the addition of chloride of calcium the mixture is allowed to rest until the reaction is completed. It is, however, advantageous to keep the solution in motion either by heating or by stirring, or by stirring and heating, whereby the reaction is assisted. The influence of the stirring or heating may be seen from the following table: To one cubic meter of brine from Schweizerhalle there were added ten kilos of chloride of calcium. The brine which has stood twenty-four hours at 18° centigrade required 3.78 kilos witherite per cubic meter. After heating for twenty-four hours to from 40° to 50° centigrade it required 3.72 kilos witherite per cubic meter. After stirring for twenty-four hours at 18° centigrade it required 3.01 kilos witherite per cubic meter. After about twenty-four hours the liquid is allowed to settle, the clear brine is drawn off from the precipitate and transferred to a second reservoir, and it is there treated with a proportion of witherite corresponding to the remaining quantity of sulphate with constant stirring. This operation can be effected in a cold or warm solution. Even in this reaction the presence of chloride of calcium appears to be advantageous. After the reaction is complete it is advisable to continue the agitation for some time. The sulphate of barium separated out is then allowed to settle, and the clear brine is separated from the deposit and evaporated until a sample of the precipitated salt, dried on a centrifugal machine, shows a tolerable amount of chloride of calcium present. On this the mother lye is drawn off from the precipitated salt. Said mother lye, which contains a good deal of chloride of calcium, is reused in the treatment of a fresh quantity of brine.

If brine be made use of which contains organic substances, it is possible by fractionating the addition of chloride of calcium to remove first such substances in order to obtain by the second addition a pure gypsum, which can be utilized in commerce.

Other compounds of calcium are also applicable for the purpose of the present invention. Thus, for instance, the calcium salts easily soluble in water, such as the bromide or the nitrate of calcium, act in a like manner to the chloride of calcium. Also the quantity of sulphates in the brine may be reduced by the use of calcium hydroxide. By means of the above and other calcium compounds chloride of calcium may be totally or partially replaced, if desired.

If there are added to one liter of Schweizerhalle brine (the sulphate contents whereof correspond to 0.9770 gram sulphate of barium per one hundred cubic centimeters) either calcium bromide or calcium nitrate or calcium hydroxide, the sulphate contents of the brine are reduced with precipitation of sulphate of calcium corresponding to the addition of the above-mentioned calcium compounds. In this case also the reaction is furthered by stirring or heating.

| Addition of calcic bromide to one liter of Schweizerhalle brine. | Quantity of sulphate of barium in one hundred cubic centimeters, after stirring for twenty hours or heating to about 95° centigrade. |
|---|---|
| 6.54 grams. | 0.9296 gram. |
| 13.08 grams. | 0.6600 gram. |
| 18.18 grams. | 0.5265 gram. |

Under the same conditions if calcium nitrate be employed its action is as follows:

| Calcium nitrate. | Barium sulphate. |
|---|---|
| 10.6 grams. | 0.7441 gram. |
| 14.8 grams. | 0.5615 gram. |
| 21.3 grams. | 0.4405 gram. |

The application of calcium hydroxide is suitable in the case of brines which possess a large percentage of sulphates. Thus, for instance, the sulphate contents of the brine of Tomblaine (containing a quantity of sulphates corresponding to 2.4070 grams barium sulphate in one hundred cubic centimeters) is reduced by the addition of twenty grams of hydroxide of calcium and the use of a stirring apparatus for twenty hours to a proportion which corresponds to 1.6680 grams barium sulphate per one hundred cubic centimeters. The same addition in the case of the Schweizerhalle brine causes the sulphate contents under like conditions to sink to an amount which corresponds to 0.9140 gram barium sulphate per one hundred cubic centimeters. The proportion of hydroxide of calcium which goes into solution should be precipitated by passing in carbonic-acid gas.

What I claim, and desire to secure by Letters Patent of the United States, is—

The process for purifying brine from sulphates which consists in adding to the brine a water-soluble salt of calcium as hereinbefore described in such proportion that the non-calcic sulphates are transformed into, and separated out as, calcium sulphate, and part of the calcium sulphate original to the brine is caused to precipitate, agitating or heating the brine while under the action of said reagent, separating the liquor from the deposit, and removing therefrom the remainder of dissolved calcium sulphate by means of barium compounds, as and for the purpose specified.

In testimony whereof I have hereunto set my hand in presence of two subscribing witnesses.

GERHARD NICOLAAS VIS.

Witnesses:
WILHELM TUDROPP BRINKNERN,
NAUS VSCHOPP.